(12) United States Patent
Kimball et al.

(10) Patent No.: US 7,760,627 B2
(45) Date of Patent: Jul. 20, 2010

(54) METHOD AND APPARATUS FOR AUTOMATIC LOAD-BALANCING ON A MULTI-SEGMENT NETWORK

(75) Inventors: Karen E. Kimball, Sacramento, CA (US); Robert L. Faulk, Jr., Roseville, CA (US); Robert M. McGuire, Napa, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 958 days.

(21) Appl. No.: 11/495,572

(22) Filed: Jul. 31, 2006

(65) Prior Publication Data
US 2007/0030804 A1 Feb. 8, 2007

Related U.S. Application Data

(60) Continuation-in-part of application No. 10/038,579, filed on Jan. 8, 2002, now Pat. No. 7,085,234, which is a division of application No. 08/738,940, filed on Oct. 24, 1996, now Pat. No. 6,345,041.

(51) Int. Cl.
*H04J 1/16* (2006.01)
*H04L 12/56* (2006.01)

(52) U.S. Cl. .................. 370/230; 370/252; 370/329; 370/389

(58) Field of Classification Search .............. 370/252, 370/389, 386, 230, 329
See application file for complete search history.

(56) References Cited

FOREIGN PATENT DOCUMENTS

GB   EP 0615362 A1 * 9/1994

* cited by examiner

*Primary Examiner*—John Pezzlo

(57) ABSTRACT

Automatic load-balancing provides a decision-making process that includes intelligent automatic detection of when a given load-balancing activation currently would not be beneficial, thereby keeping the user's network from being unnecessarily disturbed when no real benefit would be gained; a process to undo a prior load-balancing that can be activated when users have accidentally selected a feature which could substantially change their network configurations; and an extensive intelligent distribution algorithm that improves the network load by moving the right nodes to new segments.

18 Claims, 8 Drawing Sheets

METHOD AND APPARATUS FOR AUTOMATIC LOAD-BALANCING ON A MULTI-SEGMENT NETWORK

CROSS REFERENCE TO RELATED APPLICATIONS

This application is a continuation-in-part of U.S. patent application Ser. No. 10/038,579, filed Jan. 8, 2002, now U.S. Pat. No. 7,085,234 entitled "Method and Apparatus for Automatic Load-Balancing on Multisegment Devices," which is a divisional of U.S. patent application Ser. No. 08/738,940, filed Oct. 24, 1996, now U.S. Pat. No. 6,345,041, both of which are incorporated herein by reference in their entirety.

BACKGROUND

A network segment consists of repeaters, end stations, and connectivity between the stations (for example, see standard ISO/IEC 8802-3 for information on Ethernet networks). A set of predefined rules for communicating, called "protocols," determines how and when end-nodes on the network segment are allowed to communicate with one another, and what form such communication takes.

In a data communications network, data are transferred in the form of packets which contain the address of the sending station (the source address) and the address of the intended recipient (the destination address). The exact packet format, and the predefined rules for interpreting the contents of such packets, are again specific to the network type and are made up of several levels of protocols. As described herein, a network segment has the capacity to transfer a limited amount of data per second. When more than the maximum media speed of network data transfer capacity is required, multiple segments can be used. These segments can be interconnected through the use of bridges or other packet-forwarding devices, which allow communication between different segments (bridges are defined in standard ISO/IEC 10038).

The term switch has recently been applied to bridges. Switches are fast bridges which generally do not use a CPU to process the packets. Bridges contain two or more ports, each of which connects to a segment. When two stations on different segments communicate with each other, the bridge forwards the packets between the two segments. When the stations are on the same segment, the bridge does not forward the packets to any other segment. The bridge may buffer data received on its ports to allow forwarding of the data later onto a different segment that was busy when the transmission first occurred.

Over time, a network may grow as more users (end-nodes) are added. Each of these new end-nodes must then compete with existing end-nodes for access to the network. As the number of end-nodes which might potentially access the network medium grows, it becomes statistically more likely that the medium is in use when a given end-node wants to transmit, thereby requiring the end-node to wait. In addition, available network resources may be constrained when just a few end-nodes have heavy resource impact. Nodes which transmit a lot of packets, which transmit a lot of broadcast or multicast packets (received by all or many stations), or which create a lot of network disruptions (e.g., collisions, late collisions, etc.), consume a lot of the available network resources, leaving less for other end-nodes. Thus, schemes which increase the amount of network resources available (i.e. the amount of potential accessibility to the network medium), without changing the type of physical network used (preserving the users' investment), are of great use and interest.

When the network medium is shared (as opposed to switched), one way of increasing the amount of available network resources is to split the shared medium into multiple segments (i.e., segment the network). This limits the number of users who have access to any one of these segments. If it is desired to have end-nodes in a segment communicate with end-nodes in other segments, bridging or switching or routing across the segments may be employed, so that network packets for devices that are not in the immediate segment are forwarded until they reach the segment of the destination end-node.

While segmenting the network medium can improve resource availability, the choice of where to segment, e.g., which nodes should be assigned to which segment, affects the success of the results. If all of the nodes which impact network resources the most remain on the same segment, access for any one of those nodes is not much improved by this scheme, while the less resource-impacting nodes on other segments have greatly increased opportunity for access but far less need of it. In this situation, the increased resources are wasted on the wrong end-nodes.

Additionally, network systems are inherently complex. A significant amount of technical education is required to understand, configure, and maintain any particular type of physical network, e.g. 10Base-T, Ethernet, Token Ring, or FDDI networks. As the use of networks becomes widespread, the number of users responsible for such networks grows, while those among them who have sufficient knowledge to accomplish these tasks declines. Thus, schemes which can configure, maintain, or improve network conditions without requiring much specific knowledge on the part of the user are also of great use and interest. Such ease-of-use, i.e. user-friendly, schemes are often encompassed in software which is either embedded in network devices or external to them. These software applications generally are known as intelligent network agents.

One network products vendor is presently marketing a 10Base-T network switch that allows any of its ports to be assigned to any one of four internal backplane segments. The product is described as having a load-balancing feature which can be activated in one of several ways:

On-demand by the user (i.e. a manual trigger);
At a designated time or interval; or
When a user-defined threshold is reached (this is a threshold of a network value defined in the product's Management Information Base (MIB) and configured via the Simple Network Management Protocol (SNMP). For example, the MIB value could be a collision count, a segment utilization pattern, or a switch utilization pattern.

These mechanisms for triggering such actions are not new. The first two have existed in practice for some time, and the third is an aspect of recent implementations of the Remote MONitoring (RMON) suite of features. The algorithms that are actually used by the product's load-balancing feature to determine which ports to place on which of the four internal backplane segments have been informally described as being based on end-node communication patterns gleaned from address-pair information in the switch's address table. Thus, this approach requires that the switching fabric and intelligent network agent components are fully integrated into the intelligent agent's hardware environment.

Accordingly, the state of the art provides an automatic load-balancing solution that does not accommodate an inability on the part of the user or agent to communicate with the switching fabric (e.g., packet-forwarding, address table, etc.) hardware. This arrangement has a major disadvantage in that it is unusable with switches and other packet-forwarding devices which are fully external to the intelligent agent's hardware environment. It would therefore be advantageous to provide an agent that can intelligently improve network resource availability, without requiring special, integrated packet-forwarding hardware.

In addition, the prior method may result in unnecessary load-balancing. It would therefore be advantageous to reduce network disruption by performing such load-balancing only when it actually improves network resource availability.

Furthermore, it is advantageous to provide an agent that can intelligently improve network resource availability while requiring only a simple activate action on the part of the user, such that no further action or special knowledge of the agent, its environment, or networks in general (such as how to set a threshold level, or even which threshold values would be meaningful) is required on the part of the user.

SUMMARY OF A FEW ASPECTS OF THE INVENTION

In accordance with one embodiment, an automatic load-balancing apparatus for a segmented electronic network is provided. As disclosed herein, the apparatus may comprise an intelligent distribution mechanism that moves nodes to new segments to accomplish load-balancing and a detector for intelligent automatic determination of when a given load-balancing activation currently would not be beneficial.

Embodiments consistent with one aspect of the invention also relate to a method for moving nodes to new segments in a network for load balancing. As disclosed herein, the method may comprise collecting information about the nodes and segments in the network, the information including network resource impact value and assigning nodes to new segments based on the information while minimizing the unnecessary moving of nodes by keeping as many nodes as possible on previous segments.

Embodiments consistent with another aspect of the invention further relate to a machine-readable medium that stores executable instructions for moving nodes to new segments in a network for load balancing. As disclosed herein, the instructions may cause a machine to execute a method comprising the steps of collecting information about the nodes and segments in the network, the information including network resource impact value and assigning nodes to new segments based on the information while minimizing the unnecessary moving of nodes by keeping as many nodes as possible on previous segments.

Embodiments consistent with yet another aspect of the invention also relate to an apparatus for moving nodes to new segments in a network for load balancing. As disclosed herein, the apparatus may comprise means for collecting information about the nodes and segments in the network, the information including network resource impact value and means for assigning nodes to new segments based on the information while minimizing the unnecessary moving of nodes by keeping as many nodes as possible on previous segments.

It is to be understood that both the foregoing general description and the following detailed description are exemplary and explanatory only, and should not be considered restrictive of the scope of the disclosed invention. Additional features and/or variations may be provided. For example, embodiments of the invention may be directed to one or more combinations and/or sub-combinations of the features described in the detailed description.

BRIEF DESCRIPTION OF THE DRAWINGS

The accompanying drawings are incorporated in and constitute a part of this specification and, together with the description, explain the principles of the invention. In the drawings.

DETAILED DESCRIPTION

Reference will now be made in detail to exemplary embodiments consistent with the invention, examples of which are illustrated in the accompanying drawings. Wherever possible, the same reference numbers will be used throughout the drawings to refer to the same or like parts.

Figure 1:
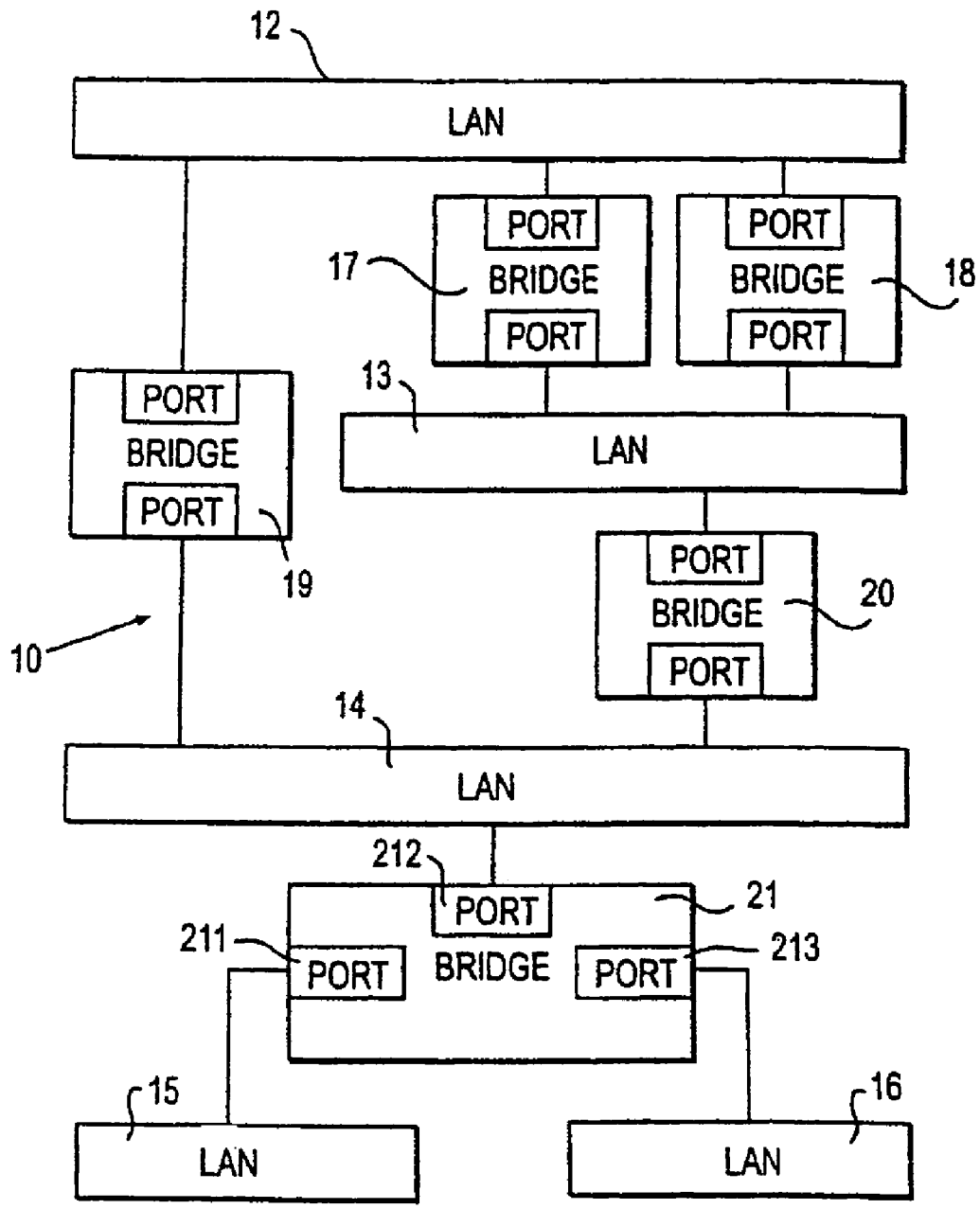
FIG. 1 is a block schematic diagram of an electronic communications network.

The following detailed description refers to the accompanying drawings. While several exemplary embodiments and features of the invention are described herein, modifications, adaptations, and other implementations are possible, without departing from the spirit and scope of the invention. For example, substitutions, additions, or modifications may be made to the components illustrated in the drawings, and the exemplary methods described herein may be modified by substituting, reordering or, adding steps to the disclosed methods. Accordingly, the following detailed description does not limit the invention FIG. 1 is a block schematic representation of a typical electronic communications network, such as an Ethernet network. The network 10 consists of several Local Area Networks (LANs) 12-16, each of which is interconnected through a number of bridges 17-21. Each LAN is connected to one or more bridges. Connection between a LAN and a bridge is through a port. For example, ports 211, 212, 213 are shown in connection with the bridge 21. The principle functions of the bridge are to relay and filter data frames, maintain the information required to make frame filtering and relaying decisions, and management of the foregoing operations. Although the preferred embodiment of the invention is discussed in connection with an Ethernet network, the invention can readily operate with networks other than Ethernet networks. In fact, the invention herein described can apply at least to FDDI, as well as any of the networks specified in the IEEE 802 family of networking standards (e.g. 802.3 and 802.5).

The invention relates to the automatic configuration of hardware and software networking products for network segmentation, e.g. with regard to balancing the flow of communications and data between nodes on network segments to obtain more throughput on the network. Such automatic configuration off-loads responsibility for the management of the network and network devices from the system administrator, thereby saving time and training. Automatic configuration as disclosed herein refers to a decision made by the load balancing system including, potentially, an out-of-the-box first plug-in decision, and any adjustment to the network devices after the network system is in use (e.g. a "find new load-distribution," "set daytime config," or a "set off-hours config" decision).

Embodiments consistent with the present invention provide an intelligent network agent that implements a feature referred to as automatic load-balancing. The invention addresses both of the major issues of network resource impact and ease-of-use described above, and intelligently improves network throughput, while requiring only a simple activate action on the part of the user such that no further action or special knowledge of the agent, its environment, or networks in general is required on the part of the user. The invention is designed to minimize network disruption by load-balancing only when it actually improves the network resource availability. Furthermore, because of the ability to use this invention in environments where packet-forwarding support hardware is external to the agent's environment, the invention works in situations where prior inventions do not, including cases where an external switch or other packet-forwarding device is manufactured by another vendor.

The automatic load-balancing method and apparatus may comprise three major components:

- A decision-making process for automatically determining when a given load-balancing activation currently would not be beneficial;
- An intelligent load-balancing distribution algorithm for assigning ports and/or end stations to segments; and
- A feature which allows undoing a prior load-balancing.

One goal for an intelligent feature of any sort involves determining when to actually implement the feature. The herein disclosed automatic load-balancing invention checks for situations in which a given automatic load-balancing activation should not occur by weighing the potential benefit of the action against its consequences, and by making an intelligent decision for the user while preventing needless network disruption.

Automatic load-balancing moves end-nodes (or groups of end-nodes) after the system has been running to increase the overall throughput of the network. This aspect of the invention may redistribute hub ports and/or end stations to segments with the goal of evenly balancing resource load across all of the known segments. Past history may be used to anticipate the future load, i.e. history since either activation of the intelligent agent or since the last time the load-balancing feature itself was activated.

The feature to undo a prior load-balancing may take information stored at a prior load-balancing activation and may use it to return ports and/or end stations to the previous configuration.

Figure 2:
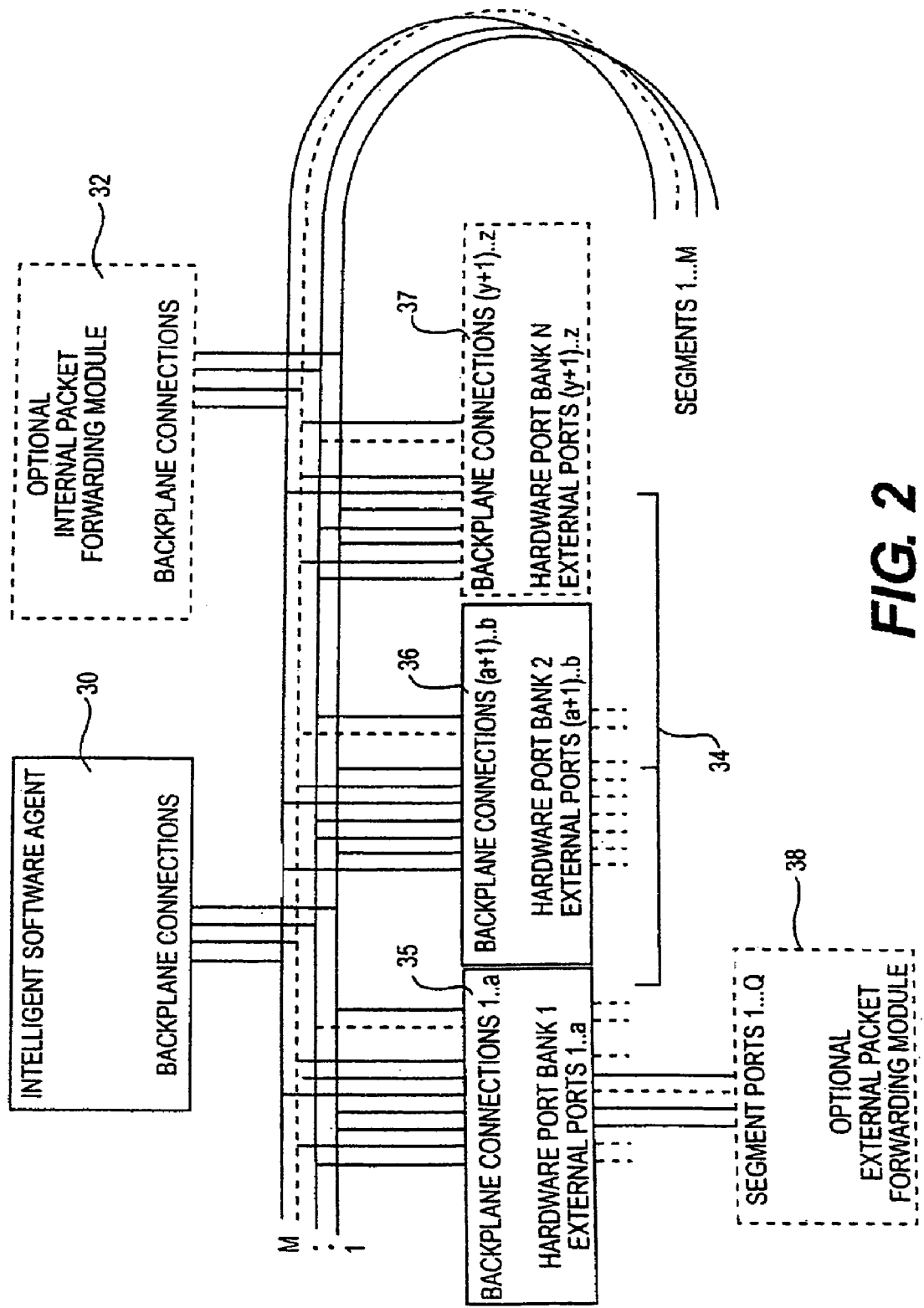
FIG. 2 is a block schematic diagram of an exemplary hardware environment, consistent with certain aspects of the present invention.

FIG. 2 is a block schematic diagram of a preferred hardware environment according to the invention. The hardware environment consists of a network hub 34 (or connected stack of hubs 35, 36, 37), a network management card 30 which contains the processor and firmware required for the intelligent network agent features described herein, and an optional internal packet-forwarding module 32 or external packet-forwarding module 38 required to maintain communication across all four of the hub stack's internal segments 1 . . . M.

The preferred packet-forwarding module 32 is integrated into the system only insofar as the module itself can be detected by the intelligent network agent 30. The hub 34 (or connected stack of hubs 35, 36, 37) has backplane connections 1 . . . a, (a+1) . . . b, (y+1) . . . z which link the external ports 1 . . . a, (a+1) . . . b, (y+1) . . . z to any one of the hub stack's backplane segments 1 . . . M. The agent and the packet-forwarding module's backplane connections tie directly into the hub stack's backplane segments 1 . . . M in the preferred embodiment of the invention. Other implementations of the invention can be applied wherein a fully external packet forwarding module 38 connects to external hub ports, e.g. 1 . . . a, of which each hub port lies on a different backplane segment 1 . . . Q. These other implementations merely require information to be given to the intelligent agent, noting which ports on which of the devices in the agent's hardware environment are connected to the packet-forwarding device(s). That information could be provided by other internal or external software mechanisms (e.g. management application topology information, messaging from a management application, or an automatic switch detection module internal to the agent), or by user input (e.g. configuration via a simple management interface).

In the presently preferred embodiment of the invention, the packet forwarding module 32 is not tightly integrated into the system, in that the intelligent agent cannot control or communicate with the module's switching fabric (e.g. packet-forwarding or address table) hardware. Thus, the herein-disclosed automatic load-balancing method and apparatus preferably accommodates the inability of a system user or the intelligent network agent to communicate with the packet-forwarding support hardware. This feature of the invention provides at least one major advantage over prior art approaches in that the invention is also usable with switches and other packet-forwarding devices which are fully external to the intelligent agent's hardware environment (including switches, bridges, or routers made by other vendors), or which are not manageable by users, such as network administrators. The invention may also be used with an external software application rather than inside an embedded software agent.

Figure 3:
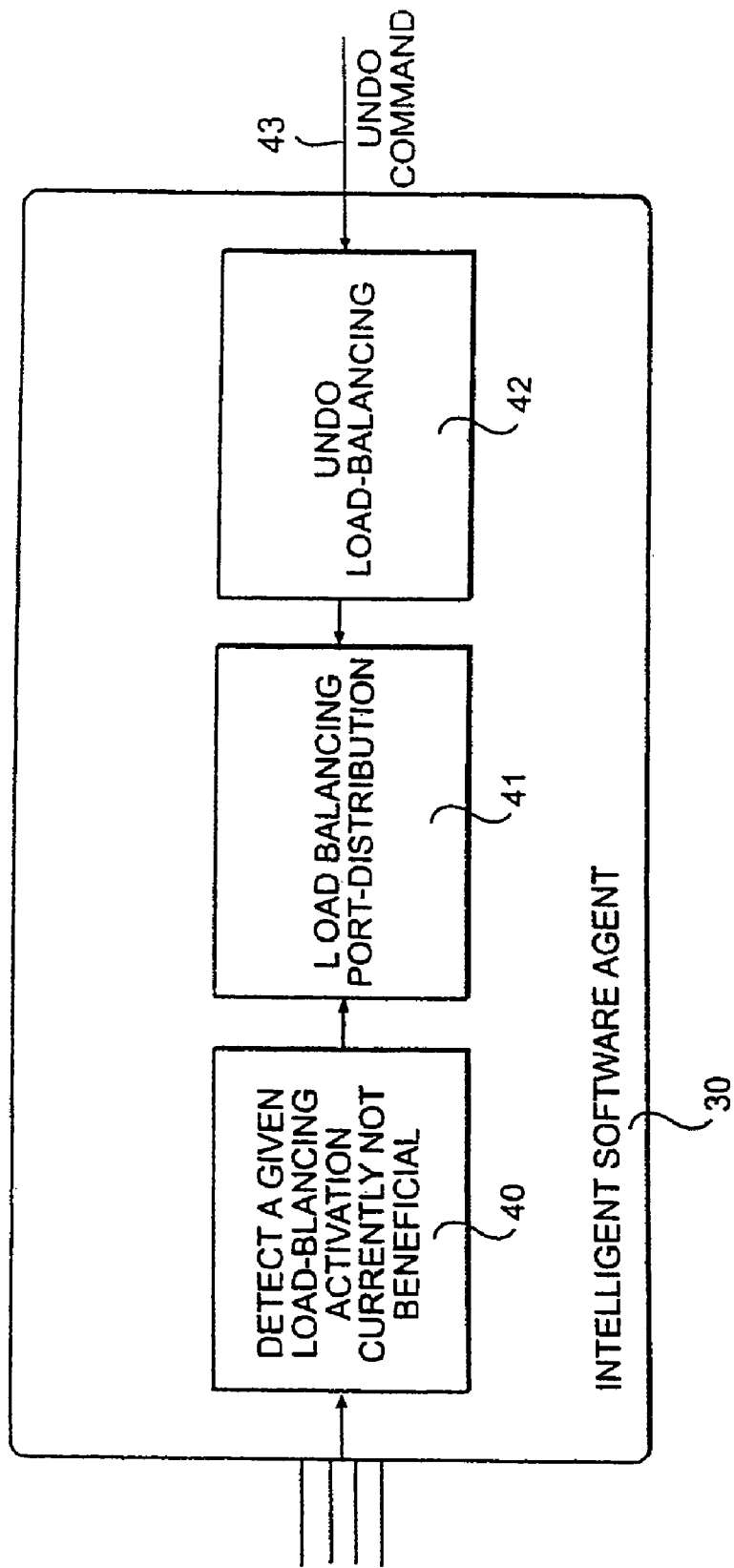
FIG. 3 is a block schematic diagram of an apparatus for automatic load balancing on segmented devices, consistent with certain aspects of the present invention.

FIG. 3 is a block schematic diagram of an apparatus for automatic load balancing on segmented devices according to the invention. The automatic load-balancing method and apparatus further comprise three major components:

- A decision-making process 40 for automatically detecting when a given load-balancing activation currently would not be beneficial;
- An intelligent load-balancing port-distribution algorithm 41 for assigning ports to segments; and
- An undo prior load-balancing feature 42 responsive to an undo command 43 issued by a user.

For network communications between all nodes to be preserved, a means for forwarding packets between the segments (e.g. a bridge, a switch or a router) must be present and enabled for the automatic load-balancing feature to be useful for the user.

Automatic Determination of When a Given Load-Balancing Activation Would Not be Beneficial One goal for an intelligent feature of any sort involves determining when to actually implement the feature. The herein disclosed automatic load-balancing invention checks for situations in which a given automatic load-balancing activation should not occur. Such situations include, for example, when the current load distribution is already good enough or when current network resource impact is so low that no real problems exist. This automatic determination of when a given instance of feature activation is not beneficial aspect of the automatic load-balancing invention weighs the potential benefit of the action against its consequences, and makes an intelligent decision for the user while preventing needless network disruption.

Intelligent Port-Distribution Algorithm

Automatic load-balancing moves end-nodes (or groups of end-nodes) after the system has been running to increase the overall throughput of the network. This aspect of the invention redistributes hub ports to segments with the goal of evenly balancing resource load across all of the known segments. Past history is used to anticipate the future load, i.e. history since either activation of the intelligent agent or since the last time the load-balancing feature itself was activated. The history can consist of the utilization on each port, communications patterns on the port, communications patterns on the segments, HP EASE data, RMON data, sampling data, or other intelligent considerations. Using the past history, this aspect of the invention moves ports to different segments to try to achieve the same network resource impact on all segments as much as possible or necessary. It should be appreciated that the load-balancing features in general could be applied to any number of segments, although four segments are used in the preferred embodiment of the invention. Additionally, the load-balancing features could also be implemented by an external software application rather than the embedded intelligent agent described in this embodiment.

A number of intelligent decisions, including which ports are to be moved, are incorporated into achieving a new load-balancing distribution. Many of these decisions further the goal of minimizing the number of ports moved from their current segment to a new segment. This is because such an action may cause a temporary disruption to any conversations which may be occurring between one or more of the moved end-nodes. These conversations occur at Open Systems Interconnection (OSI) layers higher than those with which hubs and switches concern themselves. The provision of a good distribution while minimizing the unnecessary moving of ports is one unique feature of the invention. The intelligent port distribution algorithm strives to achieve a very good network resource distribution across all segments while moving as few ports as possible. This feature of the invention includes assuring that all of the top resource-impacting end-nodes, i.e. the greatest users of the available network resources, are distributed across different segments. In addition, it accommodates situations where a particular segment may not be a good location upon which to place a particular port, i.e. it may not be fully qualified (e.g. when that segment is isolated from the multi-segment backplane on the device on which the port resides), and situations where the port should not be moved (e.g. when an external packet-forwarding device is connected to the port, or when a user or management application has designated the port not to be moved).

The herein disclosed algorithm first collects a snapshot of information about all of the ports to be considered for redistribution (automatically excluding ports which should not be moved). This information could include many network resource attributes (e.g. utilization, packets, broadcast/multicast packets, collisions, late collisions, etc.), but the presently preferred embodiment minimally notes:

Management repeater port identification value;
Management repeater previous segment identification value; and
Amount of port network resource impact since power-up or last load-balancing activation.

The preferred embodiment of the invention sorts this list of ports in descending order of network resource impact value. A list of segments on which to place the ports is also created. The algorithm proceeds, beginning with the port with the greatest network resource impact value and processing the ports in descending order. The goal is to try to keep as many ports as possible on their previous segments in an intelligent fashion, while still obtaining a good overall load-distribution.

Two such key areas of the current implementation are:
Detecting when further changes in port-to-segment assignments are not of sufficient benefit; and
Finding a well-chosen replacement port-segment assignment (if any) to use in place of each obvious pairing which the basic well-known selection algorithm (the "bin-packing" algorithm) would make.

The replacement assignments in the latter case must be in range of the basic selection algorithm's obvious port-segment assignment. For purpose of the discussion herein, in range means that the AlternatePort or AlternateSegment has some current decision-trigger value (for instance, individual port network resource impact value or segment total assigned network resource impact value) that is some deviationValue distance from the CandidatePort's or TargetSegment's value. The deviationValue could be a fixed value, a fixed percentage, the CandidatePort's percentage of the total network resource impact on all segments, or some other intelligent consideration.

Figure 4A:
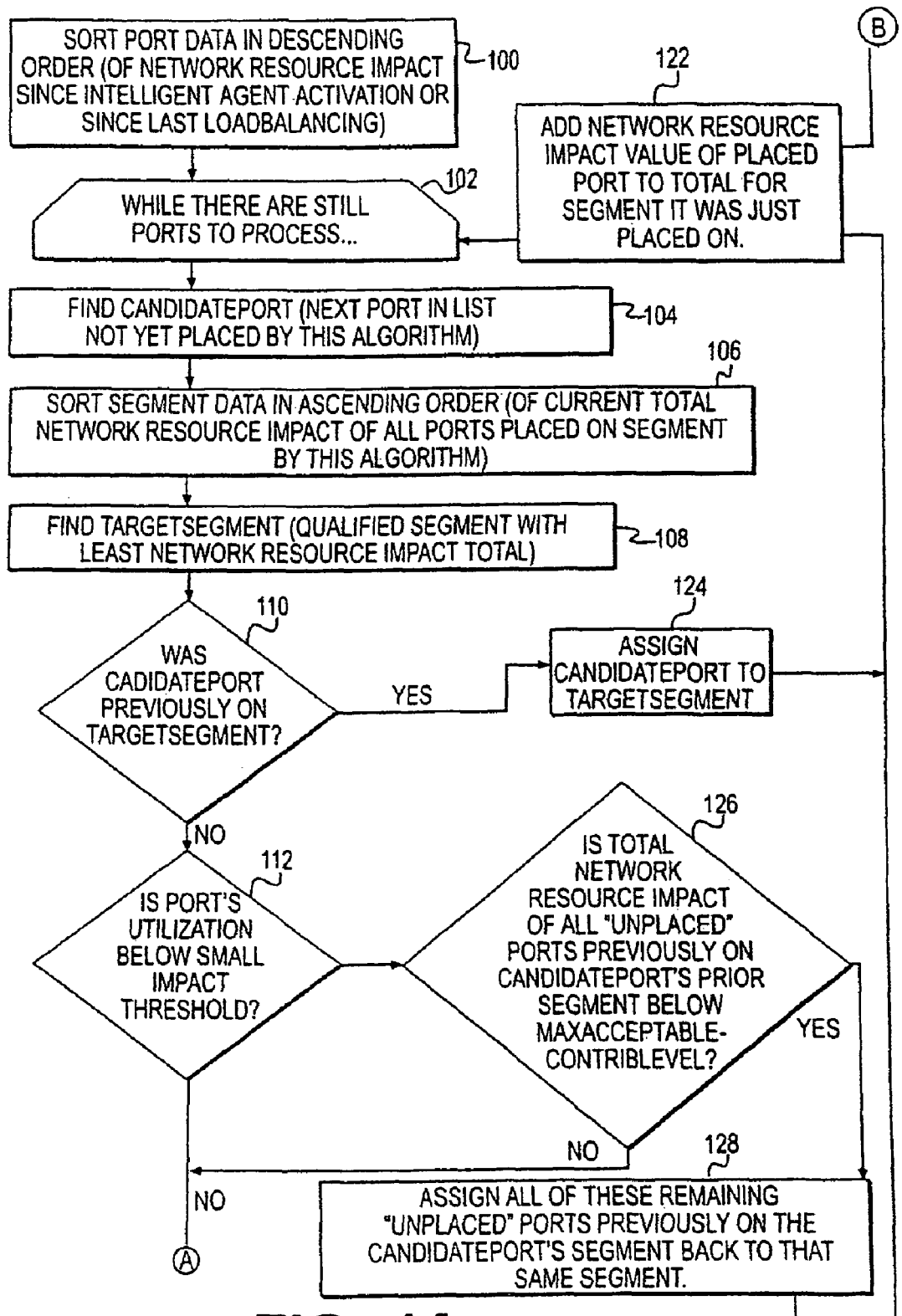
FIG. 4 is a flow diagram showing an exemplary implementation of an intelligent port distribution algorithm, consistent with certain aspects of the present invention.
Figure 4B:
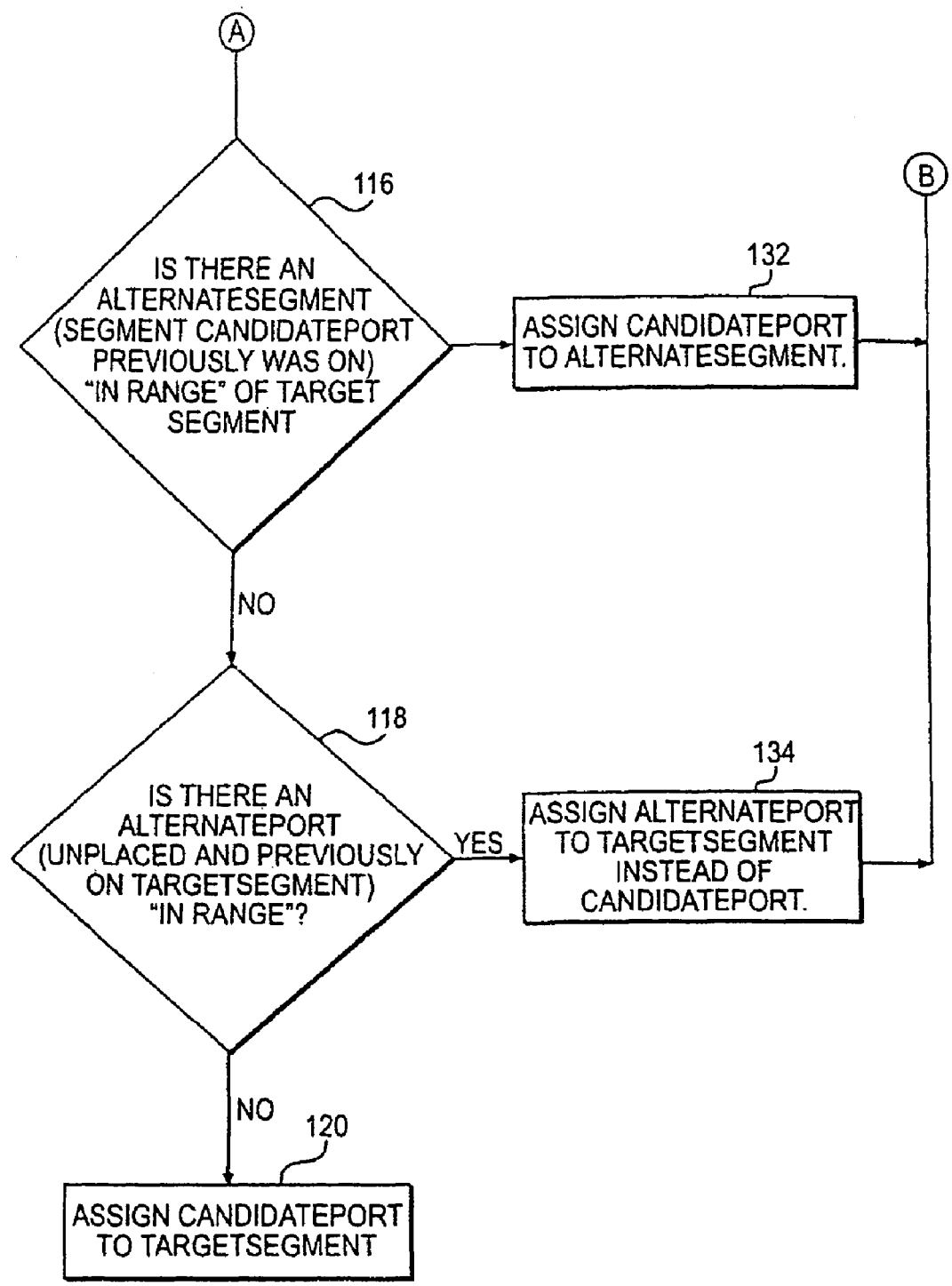

FIG. 4 is a flow diagram showing a preferred implementation of an intelligent port distribution algorithm according to the invention. The following pseudo code listing explains the algorithm in connection with FIG. 4.

```
while (there are still ports to process) (100; 102)
{
    Find the next candidate port (104). This is the next port in the sorted
        list which has not already been marked as assigned by this
        algorithm.
    Sort the segments in ascending order (106) of current total of the
        network resource impact of all ports placed on them by the
        algorithm.
    Find the first segment with the least current network resource impact
        total that is fully qualified as the target segment for the.
        CandidatePort (the restrictions for fully qualified vary from one
        implementation to another, but essentially indicate that there
        are no known adverse effects to putting the given port on the
        given segment).
            Make this the TargetSegment (108).
    Check if the CandidatePort was previously on the TargetSegment
        (110).
            If so, assign it back to that same segment (124) and
                loop again above to process any further ports
                (122, 102).
    Check whether the CandidatePort's network resource impact value is
        below a certain low threshold value, the SmallImpact threshold
        (112).
            If so, check whether the total network resource impact of
                all remaining unplaced ports that previously were
                on the CandidatePort's same segment is below
                another certain low threshold value (126),
                theMaxAcceptableContribLevel threshold.
            If so, further changes in segment assignments for these
                particular ports is not of sufficient benefit. Assign
                the CandidatePort and all of those other ports
                back to their previous segment (128) (this
                prevents moving small impacters who are not
                really affecting that much of the network's
                resources). Then loop again above to continue
                processing the ports on other segments (122,
                102).
            If not, continue processing the CandidatePort.
    Check whether an AlternateSegment exists for the CandidatePort
        (116).
```

-continued

```
        If the segment the CandidatePort was previously on is
            fully qualified with regard to the CandidatePort
            and is in range of the TargetSegment, an
            AlternateSegment exists. Assign the
            CandidatePort to this AlternateSegment (132)
            and loop again (122, 102) above to process any
            further ports.
        Look for an AlternatePort to assign to this TargetSegment in place of
            the CandidatePort. Proceeding in order through the list of
            sorted ports, check whether there is as yet a port not already
            placed by this algorithm that is in range to be used as an
            AlternatePort and for which the TargetSegment is fully
            qualified for placement (118).
                If an AlternatePort exists within range, assign it to the
                    TargetSegment instead of the CandidatePort
                    (134). Loop above again (122, 102), where the
                    next CandidatePort is the same port as for this
                    loop.
                If no AlternatePort exists within range, assign the
                    CandidatePort to the TargetSegment (120) and
                    loop above again (122, 102) to process any
                    further ports.
}
```

The use of intelligent checking for opportunities to assign ports back to the segments they were previously on minimizes needlessly moving ports, while at the same time obtaining a very good load for each segment. These intelligent checks are unique enhancements to the basic, well-known "bin-packing" selection algorithm.

Undo Prior Load-Balancing

With any user interface, there is the possibility of selecting and activating a feature by mistake. This is true whether the user interface is a simple text console or a more sophisticated mouse-driven Graphical User Interface (GUI).

If a user were to accidentally activate the automatic load-balancing feature, it would be very hard for them to later undo their mistake. This is because the same embedded intelligence that makes smart decisions on the user's behalf also hides information to keep from overwhelming the unsophisticated user. Even if the user did know the exact full port-to-segment configuration prior to activating the automatic load-balancing feature, it would be tedious for them to return the ports and segments to that configuration themselves. For example, in the current embodiment of the invention, hundreds of ports may be involved.

The undo prior load-balancing feature takes information stored at a prior load-balancing activation and uses it to return ports to that prior configuration. No action is taken on devices which were not known to the agent at the time of that prior load-balancing.

The automatic load-balancing invention offers several advantages, for example as follows:

First, it offers a decision-making process that provides intelligent automatic determination of when a given load-balancing activation currently would not be beneficial, thereby keeping the user's network from being unnecessarily disturbed when no real benefit would be gained. This user-friendly feature is enormously helpful to users who do not fully understand networks and who do not have any real sense of when network conditions do or do not suggest taking an action.

Second, it offers an undo prior load-balancing process when users have accidentally activated a feature which could substantially change their network configurations. This user-friendly feature saves users from their own mistakes, in a situation where it would otherwise be very hard for them to undo such a mistake.

The preferred embodiment of the invention provides one level of undo, although other embodiments of the invention could have many levels of undo. Each level of undo takes the user back to a next previous configuration, with the exception that newly added devices are not affected. The invention stores the previous configuration, but alternative embodiments of the invention could also provide the user with choices of default configurations, e.g. templates that provide configurations for different functions.

Third, it offers an extensive intelligent port-distribution algorithm that improves the network load by moving the right ports to new segments, while at the same time minimizing moving ports unnecessarily. With hundreds of possible ports to choose from in the maximum configuration allowed in the preferred embodiment of the invention, it would be tedious for even a sophisticated user to choose the right ports to move. Unsophisticated users do not have enough knowledge about how a network works to begin to know how to choose whether to move ports. This user-friendly feature benefits users who want better resource availability in their networks, but who lack the knowledge or the inclination to make changes themselves to improve this availability. Combined with the automatic determination of when a given instance of feature activation would not be beneficial, and the undo prior load-balancing features, it also lessens the possibility of users making choices that they may later regret.

Moreover, the intelligent port-distribution algorithm described herein merely requires multiple ports, and multiple segments to assign them to. It can be used when the intelligent network software agent does not have access to any packet-forwarding address table information. Although an internal packet-forwarding module is used in this embodiment of the invention, it should be clear that with additional information from other internal or external software mechanisms, or with minor configuration assistance from the user, other embodiments are possible in which the packet-forwarding device is external to the hub stack and the intelligent agent.

Although the invention is described herein with reference to a wired network, one skilled in the art will appreciate that the invention can readily be applied to other types of networks, such as wireless networks, to move end-nodes for automatic load-balancing. Indeed, as noted above, the invention herein described can apply to any of the networks specified in the IEEE 802 family of networking standards, which includes 802.11 directed to wireless networks.

Figure 5:
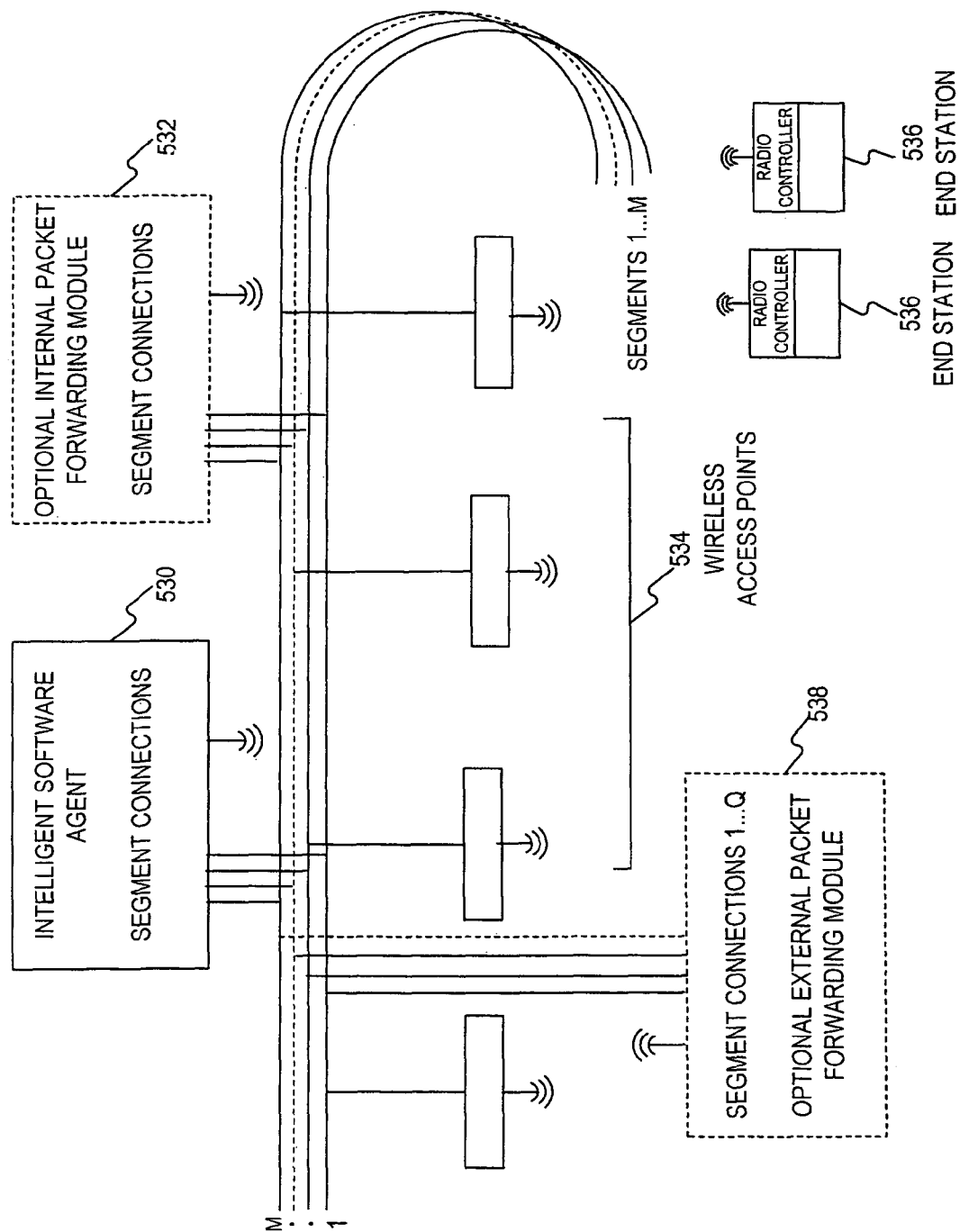
FIG. 5 is a block schematic diagram of another exemplary hardware environment, consistent with certain aspects of the present invention.

For example, in a wireless network, a network segment may include wireless access points and end stations. FIG. 5 is a block schematic diagram of this exemplary hardware environment, consistent with certain aspects of the present invention. The hardware environment may include a network management card 530, an optional internal packet-forwarding module 532, one or more wireless access points 534, one or more end stations 536, and an optional external packet-forwarding module 538. The wireless access points 534 link to any one of segments 1 . . . M.

The network management card 530, module 532, and module 538 may include features and operate in a manner similar to the network management card 30, module 32, and module 38, respectively. For example, like network management card 30, card 530 may include an intelligent software agent, a processor, and firmware. The card 530, module 532, and module 534 may tie directly into segments 1 . . . M. Alternatively, or in addition to, if segments 1 . . . M are implemented using wireless technology, card 530, module 532, and module 534 may communicate with segments 1 . . . M using radio communication as shown in FIG. 5.

Wireless access points 534 may include conventional transceivers that connect a wireless network to a wired network. As noted, the wireless access points 534 link to any one of segments 1 . . . M.

End stations 536 may include a conventional device, such as a laptop, that can communicate in the network using radio communication. For example, the end stations 536 may include a radio controller (as shown in FIG. 5) for communicating wirelessly in a network. A radio controller may include, for example, a wireless network card.

Communication between an end station 536 and an access point 534 may occur over a common channel frequency. The channel may be set in access point 534 and end station 536 may automatically tune its radio controller to the frequency of access point 534 having the strongest signal.

One of skill in the art will readily understand that the features of the intelligent software agent described above with in connection with FIGS. 2-4 may apply equally to the embodiment shown in FIG. 5. For example, the intelligent software agent on network card 530 may include processes similar to processes 40, 41, and 42 for moving end-nodes (or groups of end-nodes) for load balancing. The agent may include, for example, an intelligent end station distribution algorithm, for redistributing end stations to different radio channels (i.e., wireless access points) with the goal of evenly balancing resource load across all of the known segments. Past history, as explained above, may be used to anticipate the future load. The intelligent end station distribution algorithm may strive to achieve a very good network resource distribution across all segments while moving as few end stations as possible. The algorithm may assure that all of the top resource-impacting end-nodes, i.e. the greatest users of the available network resources, are distributed across different segments. In addition, the algorithm may accommodate situations where a particular segment may not be a good location upon which to place a particular end station, i.e. it may not be fully qualified (e.g. when that segment is isolated from the segment on which the end station resides), and situations where the end station should not be moved (e.g. when an external packet-forwarding device is connected to the end station, or when a user or management application has designated the end station not to be moved).

Figure 6A:
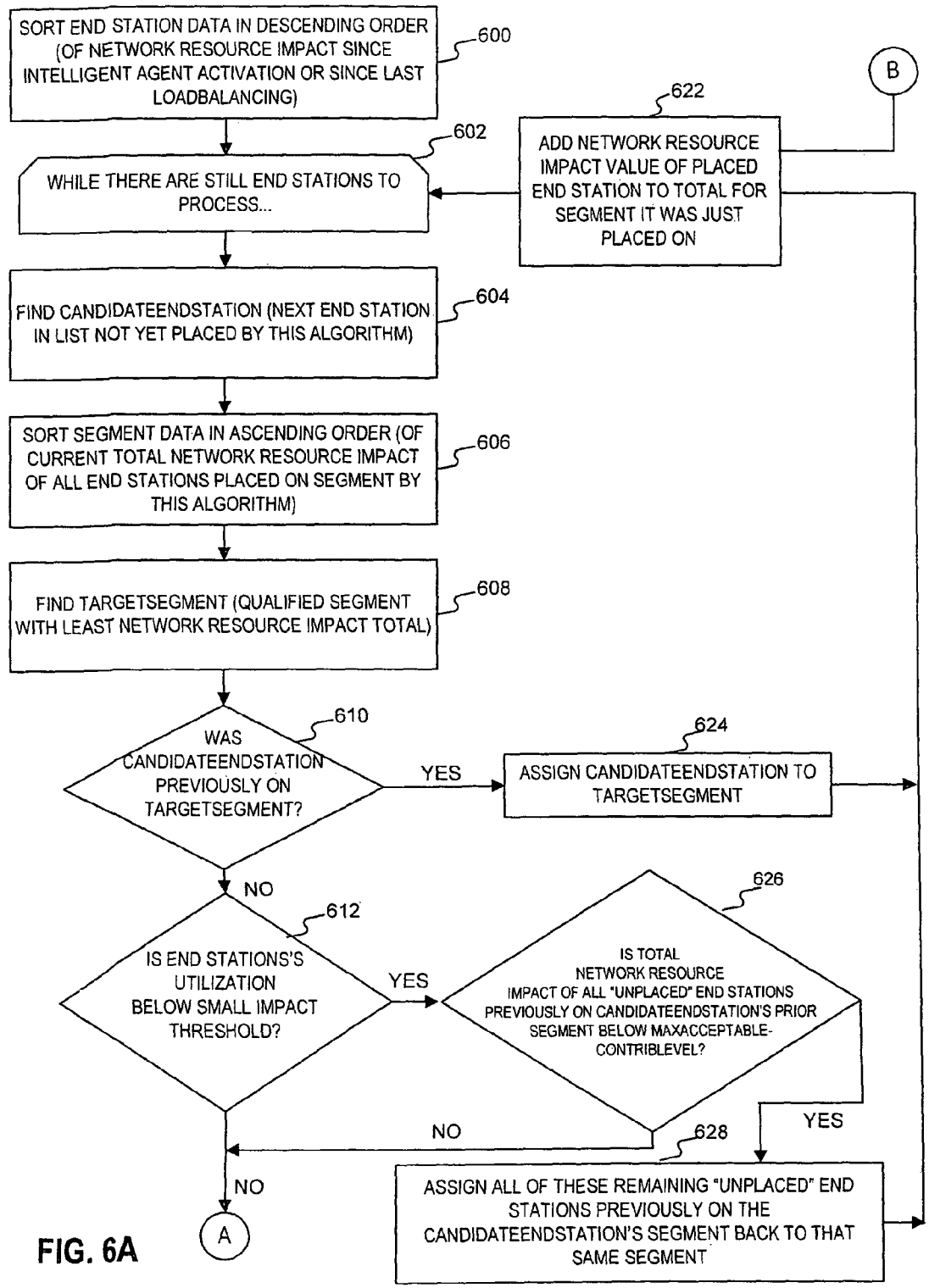
FIG. 6 is a flow diagram showing an exemplary implementation of an intelligent end station distribution algorithm, consistent with certain aspects of the present invention.
Figure 6B:
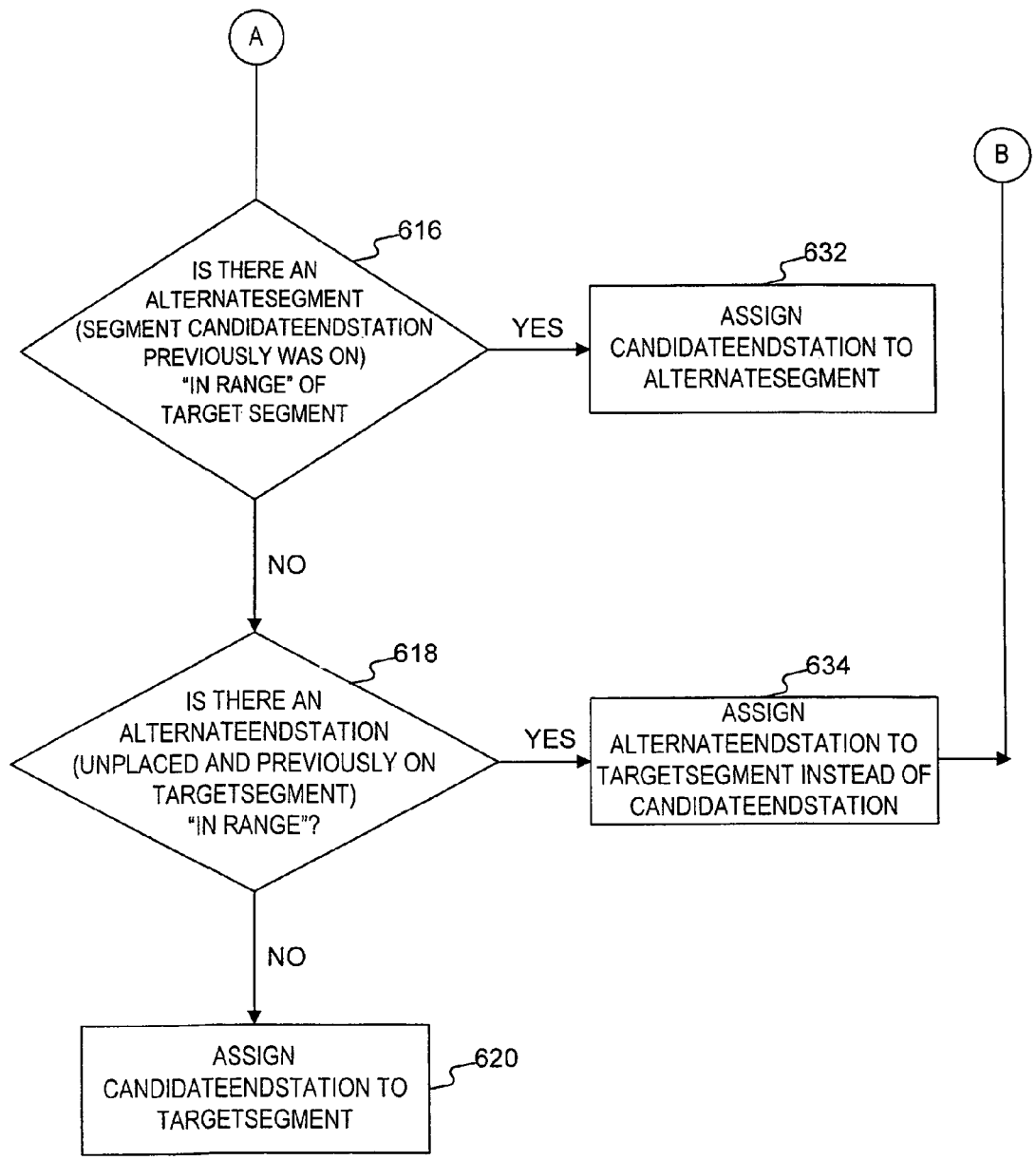

FIG. 6 is a flow diagram showing an exemplary implementation of an intelligent end station distribution algorithm, consistent with the present invention. The following pseudo code listing explains the algorithm in connection with FIG. 6:

```
while (there are still end stations to process) (600; 602)
{
    Find the next candidate end station (604). This is the next end station
        in the sorted list which has not already been marked as
        assigned by this algorithm.
    Sort the segments in ascending order (606) of current total of
        thenetwork resource impact of all end stations placed on them
        by the algorithm.
    Find the first segment with the least current network resource impact
        total that is fully qualified as the target segment for the
        CandidateEndStation (the restrictions for fully qualified vary
        from one implementation to another, but essentially indicate
        that there are no known adverse effects to putting the given
        end station on the given segment).
            Make this the TargetSegment (608).
    Check if the CandidateEndStation was previously on the
        TargetSegment (610).
```

```
        If so, assign it back to that same segment (624) and loop
            again above to process any further end stations
            (622, 602)
    Check whether the CandidateEndStation's network resource impact
        value is below a certain low threshold value, the SmallImpact
        threshold (612).
            If so, check whether the total network resource impact of
                all remaining unplaced end stations that previously
                were on the CandidateEndStation's same
                segment is below another certain low threshold
                value (626), the MaxAcceptableContribLevel
                threshold.
            If so, further changes in segment assignments for these
                particular end stations is not of sufficient benefit.
                Assign the CandidateEndStation and all of those
                other endstations back to their previous
                segment(628) (this prevents moving small
                impacters who are not really affecting that much of
                the network's resources). Then loop again above
                to continue processing the endstations on other
                segments (622, 602),
            If not, continue processing the CandidateEndStation.
    Check whether an AlternateSegment exists for the
        CandidateEndStation (616).
            If the segment the CandidateEndStation was previously
                on is fully qualified with regard to the
                CandidateEndStation and is in range of the
                TargetSegment, an AlternateSegment exists.
                Assign the CandidateEndStation to this
                AlternateSegment (632) and loop again (622, 602)
                above to process any further end stations.
    Look for an AlternateEndStation to assign to this TargetSegment in
        place of the CandidateEndStation. Proceeding in order through
        the list of sorted end stations, check whether there is as yet an
        end station not already placed by this algorithm that is in range
        to be used as an AlternateEndStation and for which the
        TargetSegment is fully qualified for placement (618).
            If an AlternateEndStation exists within range, assign it to
                the TargetSegment instead of the
                CandidateEndStation (634). Loop above again
                (622, 602), where the next CandidateEndStation is
                the same end station as for this loop.
            If no AlternateEndStation exists within range, assign the
                CandidateEndStation to the TargetSegment (620)
                and loop above again (622, 602) to process any
                further end stations.
}
```

In this exemplary embodiment, when the intelligent agent needs to move an end station 536 to a new segment (for example, when the intelligent end station distribution algorithm determines that the end station 536 should be moved to a different segment), it can transmit a message to the end station 536 informing it of the new channel for the target segment. The agent can continue to periodically transmit this message until a response is received from the end station acknowledging or rejecting the new channel.

Similar to the embodiment described in connection with FIGS. 2-4, there may be times when some channels are inaccessible to the end station 536 due to interference or other problems. If the end station 536 is not able to associate with the radio on the new channel, it can change back to the previous channel and transmit a negative acknowledgement back to the intelligent agent informing it of the problem. At this point, the intelligent end station distribution algorithm may no longer consider the end station as being fully qualified for that segment.

It will be apparent to one of skill in the art that the above-noted features and principles of the present invention may be implemented in various network configurations, such as one that combines both wired and wireless networks. Such configurations and applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes consistent with the present invention. The media and program instructions may be those specially designed and constructed for the purposes of the invention, or they may be of the kind well-known and available to those having skill in the computer software arts. The media may take many forms including, but not limited to, non-volatile media, volatile media, and transmission media. Non-volatile media includes, for example, optical or magnetic disks. Volatile media includes, for example, dynamic memory. Transmission media includes, for example, coaxial cables, copper wire, and fiber optics. Transmission media can also take the form of acoustic or light waves, such as those generated during radio-wave and infra-red data communications. Examples of program instructions include both machine code, such as produced by compiler, and files containing a high level code that can be executed by the computer using an interpreter.

While the foregoing detailed description of the invention and figures described exemplary embodiments, other embodiments are possible and changes may be made to the embodiments described without departing from the spirit and scope of the invention. Indeed, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An automatic load-balancing apparatus for a segmented electronic network, comprising:
    an intelligent distribution mechanism that moves nodes to new segments to accomplish load-balancing; and
    a detector for intelligent automatic determination of when a given load-balancing activation currently would not be beneficial,
    wherein the nodes include at least one end station that is associated with a first wireless access point.

2. The apparatus of claim 1, wherein the detector inhibits load balancing when a current load distribution is acceptable or when current network resource impact is so low that no real problems exist.

3. The apparatus of claim 2, wherein the detector weighs potential benefit of an action against its consequences, and makes an intelligent decision for a user while preventing needless network disruption.

4. The apparatus of claim 1, wherein the network includes at least one of a wired network and a wireless network.

5. The apparatus of claim 1, wherein the intelligent distribution mechanism moves the end station to a new segment by requesting the end station to associate with a second wireless access point.

6. The apparatus of claim 1, wherein the nodes are connected to ports and the intelligent distribution mechanism moves nodes to new segments by moving the ports to the new segments.

7. A method performed by a computer system for moving nodes to new segments in a network for load balancing, comprising:
    collecting information about the nodes and segments in the network, the information including network resource impact value; and
    assigning nodes to new segments based on the information while minimizing the unnecessary moving of nodes by keeping as many nodes as possible on previous segments,
    wherein the nodes include at least one end station that is associated with a first wireless access point.

8. The method of claim 7, further comprising:
    inhibiting load-balancing when a current load distribution is acceptable or when current network resource impact is so low that no real problems exist.

9. The method of claim 7, further comprising:
    weighing potential benefit of an action against its consequences; and
    making an intelligent decision for a user while preventing needless network disruption.

10. The method of claim 7, wherein the network includes at least one of a wired network and a wireless network.

11. The method of claim 7, wherein assigning nodes to new segments includes moving the end station to a new segment by requesting the end station to associate with a second wireless access point.

12. The method of claim 7, wherein the nodes are connected to ports and assigning nodes to new segments includes moving the ports to the new segments.

13. A computer-readable storage medium device that stores executable instructions for moving nodes to new segments in a network for load balancing, the instructions causing a computer to execute a method comprising:
    collecting information about the nodes and segments in the network, the information including network resource impact value; and
    assigning nodes to new segments based on the information while minimizing the unnecessary moving of nodes by keeping as many nodes as possible on previous segments,
    wherein the nodes include at least one end station that is associated with a first wireless access point.

14. The computer-readable storage medium device of claim 13, wherein the method further comprises:
    inhibiting load-balancing when a current load distribution is acceptable or when current network resource impact is so low that no real problems exist.

15. The computer-readable storage medium device of claim 14, the method further comprises:
    weighing potential benefit of an action against its consequences; and
    making an intelligent decision for a user while preventing needless network disruption.

16. The computer-readable storage medium device of claim 13, wherein the network includes at least one of a wired network and a wireless network.

17. The computer-readable storage medium device of claim 13, wherein assigning nodes to new segments includes moving the end station to a new segment by requesting the end station to associate with a second wireless access point.

18. An apparatus for moving nodes to new segments in a network for load balancing, comprising:
- means for collecting information about the nodes and segments in the network, the information including network resource impact value; and
- means for assigning nodes to new segments based on the information while minimizing the unnecessary moving of nodes by keeping as many nodes as possible on previous segments,
- wherein the nodes include at least one end station that is associated with a first wireless access point.

* * * * *